United States Patent
Ramasubbu

(10) Patent No.: US 12,249,248 B1
(45) Date of Patent: Mar. 11, 2025

(54) EDUCATIONAL BOOK COVERS

(71) Applicant: Saranya Ramasubbu, Austin, TX (US)

(72) Inventor: Saranya Ramasubbu, Austin, TX (US)

(73) Assignee: SchoolX LLC, Austin, TX (US)

(*) Notice: Subject to any disclaimer, the term of this patent is extended or adjusted under 35 U.S.C. 154(b) by 0 days.

(21) Appl. No.: 18/399,261

(22) Filed: Dec. 28, 2023

(51) Int. Cl.
  *B42D 3/12* (2006.01)
  *B42F 13/00* (2006.01)
  *B42F 13/16* (2006.01)
  *G09B 23/10* (2006.01)

(52) U.S. Cl.
  CPC ............... *G09B 23/10* (2013.01); *B42D 3/12* (2013.01); *B42F 13/0006* (2013.01); *B42F 13/16* (2013.01)

(58) Field of Classification Search
  None
  See application file for complete search history.

(56) References Cited

U.S. PATENT DOCUMENTS

2014/0120504 A1* 5/2014 Lam .................. A63H 33/38
434/178

FOREIGN PATENT DOCUMENTS

GB          2139952 A  * 11/1984  ............... B42D 3/10

* cited by examiner

*Primary Examiner* — James B Hull
(74) *Attorney, Agent, or Firm* — Mohr Intellectual Property Law Solutions, PC

(57) ABSTRACT

Educational book covers including a spine, a cover member, and a pull mechanism. The cover member pivotally couples to the spine. The cover member has an outer face. The pull mechanism is attached to the outer face. The pull mechanism includes a track and a knob. The track is coupled to the outer face. The track defines fixed pull positions along the length of the track. The knob is complementarily configured with the track to selectively rest within the fixed pull positions. The cover member includes unique indicia aligned with each fixed pull position to identify and differentiate the fixed pull positions for educational purposes. More force is required to pivot the cover member relative to the spine by pulling the knob when the knob is selectively translated within the track closer to the spine than when the knob is selectively translated within the track farther from the spine.

19 Claims, 8 Drawing Sheets

EDUCATIONAL BOOK COVERS

BACKGROUND

The present disclosure relates generally to educational book covers. In particular, educational book covers with pull mechanisms to demonstrate torque concepts are described.

Education is recognized as one of the most powerful instruments for building a prosperous, secure, and healthy community. In today's rapidly advancing world, a solid grasp of science, technology, engineering, and math (STEM) concepts is crucial. For students to truly comprehend STEM principles, they need access to essential resources like books, libraries, study materials, labs, electronic devices, and proficient STEM educators.

Without these essential resources and tools, students may resort to rote memorization of concepts, potentially hindering their ability to grasp the underlying principles and reasons behind the concepts. This could have a detrimental effect on the future workforce, especially given the swiftly evolving global landscape, characterized by technological breakthroughs and intricate challenges demanding innovative solutions. Unfortunately, a significant number of students lack access to these vital resources, particularly students in low-income, underserved communities; students who are homeschooled, and students in refugee camps.

Not every government, educational institution, and parent can afford traditional educational resources, electronic devices, or private tutoring. As a result, society must find solutions to bridge this gap and ensure equitable STEM education for all.

It would be desirable to have educational tools to help bridge education gaps and to provide accessible STEM education to everyone. The tools should be inexpensive and easy to ship to enable wider distribution. Tools that do not require electronic devices to use would be preferred because many students do not have access to electronic devices.

For educational effectiveness, the educational tools should be simple to use and engaging. The tools would make educational concepts more interesting to foster a deeper understanding of the subject matter. Preferably, the educational tools would enable students to experiment with physics concepts through physical interaction with the tool as a supplement to reading and listening to teacher lessons about the concepts.

For example, with the physics concept of torque considered, it would be desirable to have a tool that enabled students to experiment with the physical attributes of torque. The equation $$\text{Torque}(L) = \text{Force}(F) \times \text{Distance}(r) \times \sin(\theta)$$

describes the torque relationship between force, distance, and angle of force application. A tool would foster interest and comprehension of torque concepts if it enabled students to experiment with altering a moment arm distance, adjusting the force acting on a moment arm, and varying an angle of force application. Such a tool would allow students to observe and feel the torque resulting from their manipulation of the moment arm, force, and angle parameters.

It would be desirable if an educational tool could be incorporated into a book or binder cover. Books and binders are commonly used to deliver educational material to students, so utilizing the covers as an educational tool would provide an opportunity to amplify the educational power of the books and binders. Further, incorporating an educational tool into a book or binder delivered to students adds an additional educational tool without requiring one to ship an additional item, which reduces costs and increases distribution opportunities.

Thus, there exists a need for educational book covers that facilitate providing widespread access to STEM education. Examples of new and useful educational book covers relevant to the needs existing in the field are discussed below.

Existing patent filings relevant to educational book covers include U.S. Pat. No. 463,014A, U.S. Pat. No. 7,237,756B2, U.S. Pat. No. 11,613,139B2, US20080217903A1, U.S. Pat. No. 3,161,035A, KR200474438Y1, US20190084335A1, US20090140511A1, and US20070272757A1. The complete disclosures of these listed patent filings, identified by either patent or publication number, are herein incorporated by reference for all purposes.

SUMMARY

The present disclosure is directed to educational book covers including a spine, a cover member, and a pull mechanism. The cover member is pivotally coupled to the spine. The cover member has an outer face, and the pull mechanism is attached to the outer face.

The pull mechanism includes a track and a knob. The track is coupled to the outer face. The track defines fixed pull positions along the length of the track. The knob is complementarily configured with the track to selectively rest within the fixed pull positions.

The cover member includes unique indicia aligned with each fixed pull position to identify and differentiate the fixed pull positions for educational purposes. More force is required to pivot the cover member relative to the spine by pulling the knob when the knob is selectively translated within the track closer to the spine than when the knob is selectively translated within the track farther from the spine.

In some examples, the track is pivotally coupled to the outer face. This document describes certain examples where the track is pivotally coupled to the outer face proximate the spine. As described below, in particular instances, the track is pivotally coupled to the outer face proximate a medial position of the spine.

In select embodiments, the track includes a first longitudinal end. The track may be pivotally coupled to the outer face at the first longitudinal end.

In some examples, the track is configured to pivot about a range of 180 degrees between a first orientation and a second orientation. The track may extend towards a top of the outer face in the first orientation. The track may extend towards a bottom of the outer face in the second orientation.

This document describes certain examples where the length of the track is at least 80% of the width of the outer face perpendicular to the spine to provide an instructive range of pull positions.

In select embodiments, the outer face includes a far end opposite the spine. The far end extends parallel to the spine. The fixed pull positions include a maximum torque position proximate the far end when the track is oriented perpendicular to the spine.

As described below, in particular instances, the fixed pull positions include a minimum torque position proximate the spine when the track is oriented perpendicular to the spine. A maximum amount of force is required to pivot the cover relative to the spine when the knob is translated to the minimum torque position.

In some examples, the fixed pull positions include a plurality of intervening torque positions between the maximum torque position and the minimum torque position.

This document describes certain examples where the knob includes a body, a neck, and a head. The neck may extend from the body. The head may be fixed to the neck.

In select embodiments, the track includes a trough and a top member. The trough may define a channel. The top member may be supported on the trough over the channel. The top member may define a slot extending longitudinally along the length of the track and providing access to the channel.

As described below, in particular instances, the body of the knob is disposed in the channel between the trough and the top member. The neck of the knob may extend through the slot. The head of the knob may be disposed outside the channel.

In some examples, the body is restricted from passing through the slot by having a body dimension corresponding to a gap dimension of the slot that exceeds the gap dimension.

This document describes certain examples where the fixed pull positions are each defined by a notch defined in the slot. In select embodiments, the neck and the notch are complementarily configured to enable the neck to extend into the notch. As described below, in particular instances the notch restricts the knob from translating in the track when the neck extends into the notch.

In some examples, the educational book cover includes pages bound to the spine to define an educational book. This document describes certain examples where the outer cover covers the pages bound to the spine until the outer cover is pivoted relative to the spine away from the pages.

In some examples, the educational book cover includes a ring coupled to the spine to define an educational binder. The ring may be configured to support pages selectively mounted to the ring.

DETAILED DESCRIPTION

Figure 1:
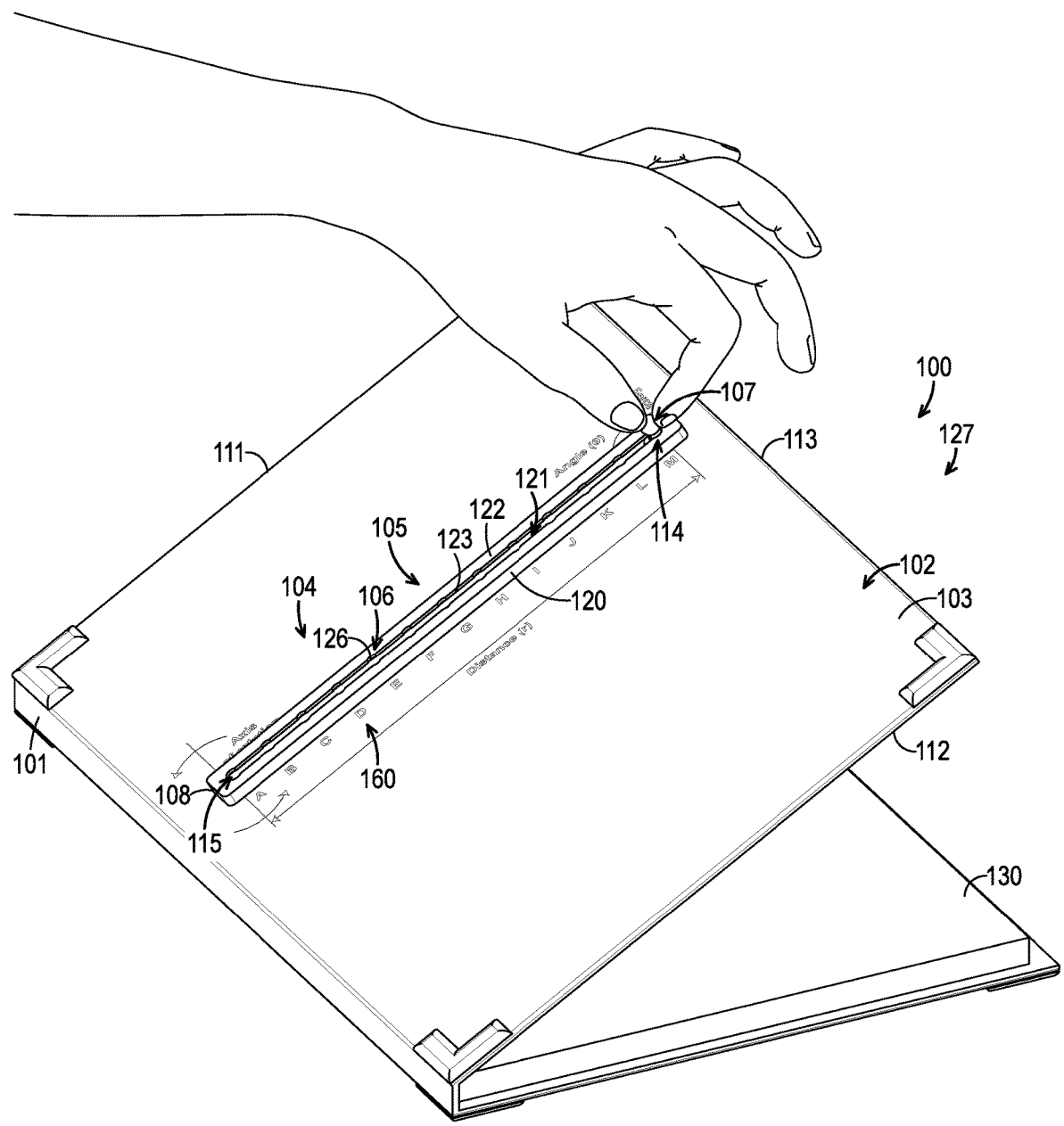
FIG. 1 is a perspective view of a first embodiment of an educational book cover with pages bound to a cover member to define an educational book.

The disclosed educational book covers will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various educational book covers are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Educational Book Covers

With reference to the figures, educational book covers will now be described. The educational book covers discussed herein function to enable students to experiment with torque concepts by physically manipulating torque parameters of moment arm distance, pivoting force, and force application angles. The novel educational book covers discussed below help bridge education gaps and to provide accessible STEM education to everyone.

Importantly, the reader should understand that the term book in educational book covers is used for convenience and familiarity to common applications for the novel educational covers. However, the novel educational book covers described herein are not limited to book applications. Indeed, the educational book covers may be used on books, binder, folders, portfolios, protective covers, and the like.

The reader will appreciate from the figures and description below that the presently disclosed educational book covers address many of the existing challenges with making STEM educational accessible to more students. For example, the novel educational book covers are relatively inexpensive and easy to ship to enable wide distribution to students. The novel educational book covers do not require electronic devices to use, which makes them accessible to students who do not have access to electronic devices.

The novel educational book covers are educationally effective because they are simple to use and engaging for students. The novel educational book covers make educational concepts more interesting to foster a deeper understanding of physics related subject matter. Beneficially, the novel educational book covers enable students to experiment with physics concepts through physical interaction as a supplement to reading and listening to teacher lessons about the physics concepts.

In particular, the novel educational book covers enable students to experiment with the physical attributes of torque. The novel educational book covers fosters interest and comprehension of torque concepts by enabling students to experiment with altering a moment arm distance, adjusting the force acting on a moment arm, and varying an angle of force application. As a result, the novel educational book covers allow students to observe and feel the torque resulting from their manipulation of the moment arm, force, and angle parameters.

Advantageously, the novel educational book covers are incorporated into a book or binder cover. Thus, the novel educational book covers amplify the educational power of books and binders provided to students. Further, the novel educational book covers being incorporated into a book or binder delivered to students adds an additional educational tool without requiring one to ship an additional item, which reduces costs and increases distribution opportunities.

Educational Book Cover Embodiment One

With reference to FIGS. 1-7, an educational book cover 100 will now be described as a first example of an educational book cover. A second example of an educational book cover, educational book cover 200, is shown in FIG. 8.

The role of educational book cover 100 is to demonstrate physics concepts to students. In particular, educational book cover 100 demonstrates torque related concepts to students by allowing students to observe the relative force required to pivot open book cover 100 by pulling from different positions on book cover 100. The different pull positions enabled by book cover 100 derive from students translating a knob 107 within a track 105 on a cover member 102 and/or rotating track 105 relative to cover member 102. Thus, educational book cover 100 allows students to experiment with both linear and angular aspects of torque.

As shown in FIGS. 1-7, educational book cover 100 includes a spine 101, a cover member 102, and a pull mechanism 104. Further, in the present example, educational book cover 100 includes pages 130 to define an educational book 127. The spine, cover member, pull mechanism, and pages components are discussed in detail below.

The size and shape of the educational book cover may be varied as needed for a given application. In some examples, the educational book cover is larger or smaller than depicted in the figures.

Spine

Spine 101 enables cover member 102 to pivot open and closed. Cover member 102 pivoting relative to spine 101 serves to reveal pages 130 and to demonstrate how torque affects the force required to pivot cover member 102. Further, spine 101 functions to bind pages 130 to configure educational book cover 100 as an educational book 127.

In the present example, spine 101 is configured as a living hinge. The living hinge configuration allows cover member 102 to pivot open and closed.

The size and shape of the spine may be varied as needed for a given application. In some examples, the spine is larger or smaller relative to the other components than depicted in the figures.

The spine may be any currently known or later developed type of spine for books, binders, and the linke. Various spine types exist and could be used in place of the spine shown in the figures. In addition to the types of spines existing currently, it is contemplated that the educational book covers described herein could incorporate new types of spines developed in the future.

Cover Member

Cover member 102 serves to support pull mechanism 104. Further, cover member 102 functions to selectively cover pages 130. Cover member 102 also serves to display indicia 160 supporting torque experimentation with pull mechanism 104.

Figure 6:
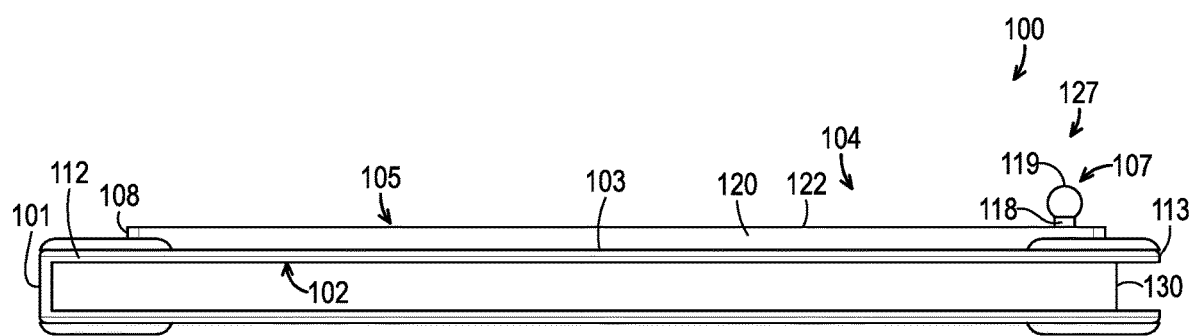
FIG. 6 is a bottom side elevation view of the educational book cover shown in FIG. 1.
Figure 7B:
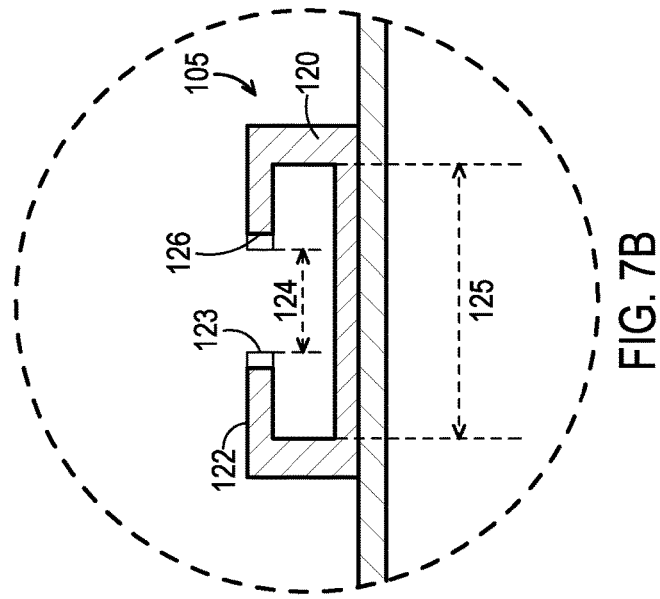
FIG. 7B is an enlarged view of the track cross section depicted in FIG. 7A.

With reference to FIG. 1, cover member 102 pivotally couples to spine 101. As depicted in FIGS. 1 and 6, cover member 102 covers pages 130 bound to spine 101 until cover member 102 is pivoted relative to spine 101 away from pages 130.

As depicted in FIGS. 1-5, cover member 102 displays unique indicia 160 aligned with each fixed pull position 106 of pull mechanism 104. Indicia 160 displayed on cover member 102 identify and differentiates different fixed pull positions 106 for educational purposes. Additional indicia referencing angular positions and summarizing educational concepts may be displayed on the cover member as well.

The reader can see in FIGS. 1-6 that cover member 102 has an outer face 103. Outer face 103 is on an opposite side of cover member 102 than an inner face facing pages 130 bound to spine 101. Indicia 160 are displayed on outer face 103, and pull mechanism 104 is supported on outer face 103.

Figure 2:
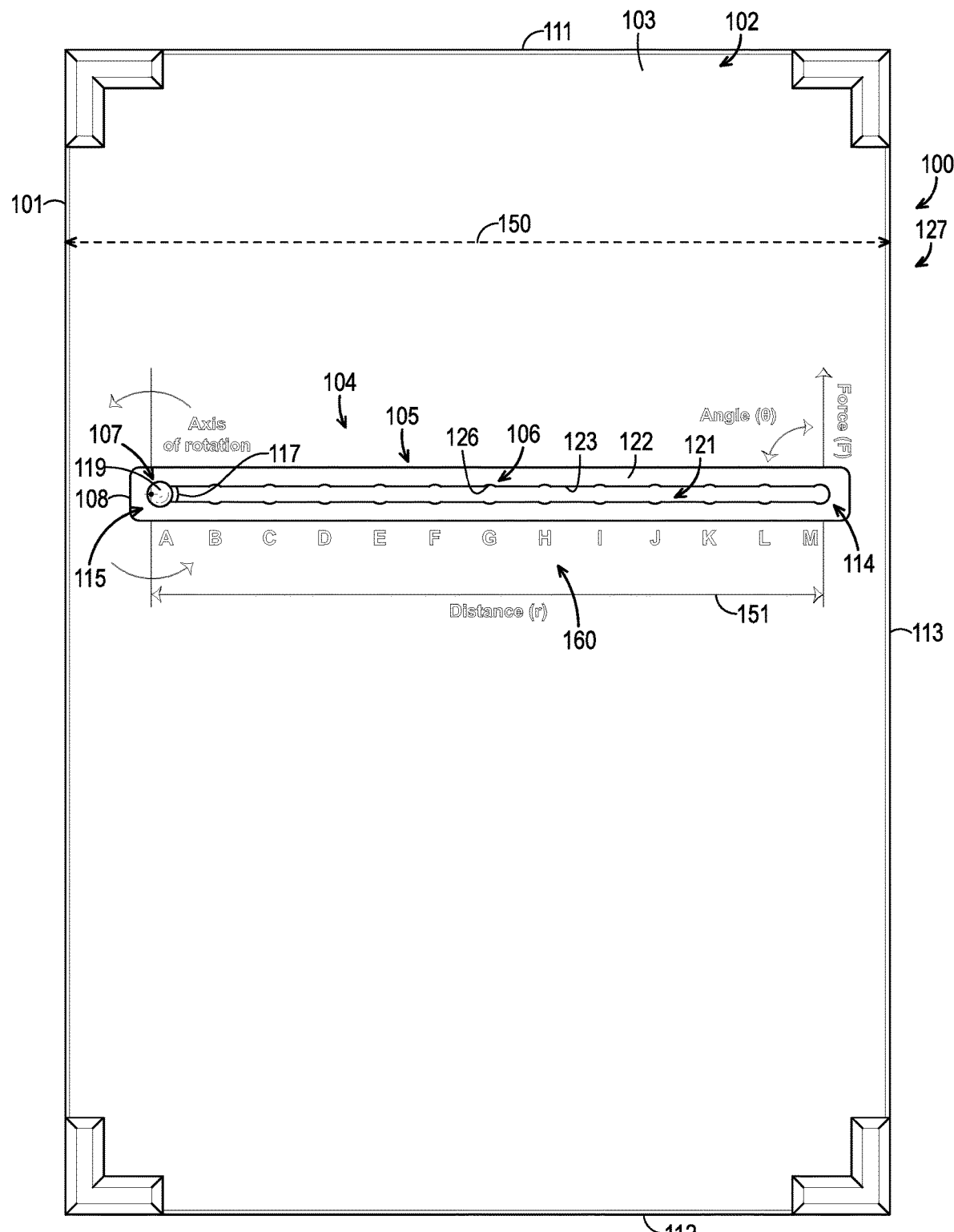
FIG. 2 is a top plan view of the educational book cover shown in FIG. 1 with a knob in a minimum torque position.
Figure 3:
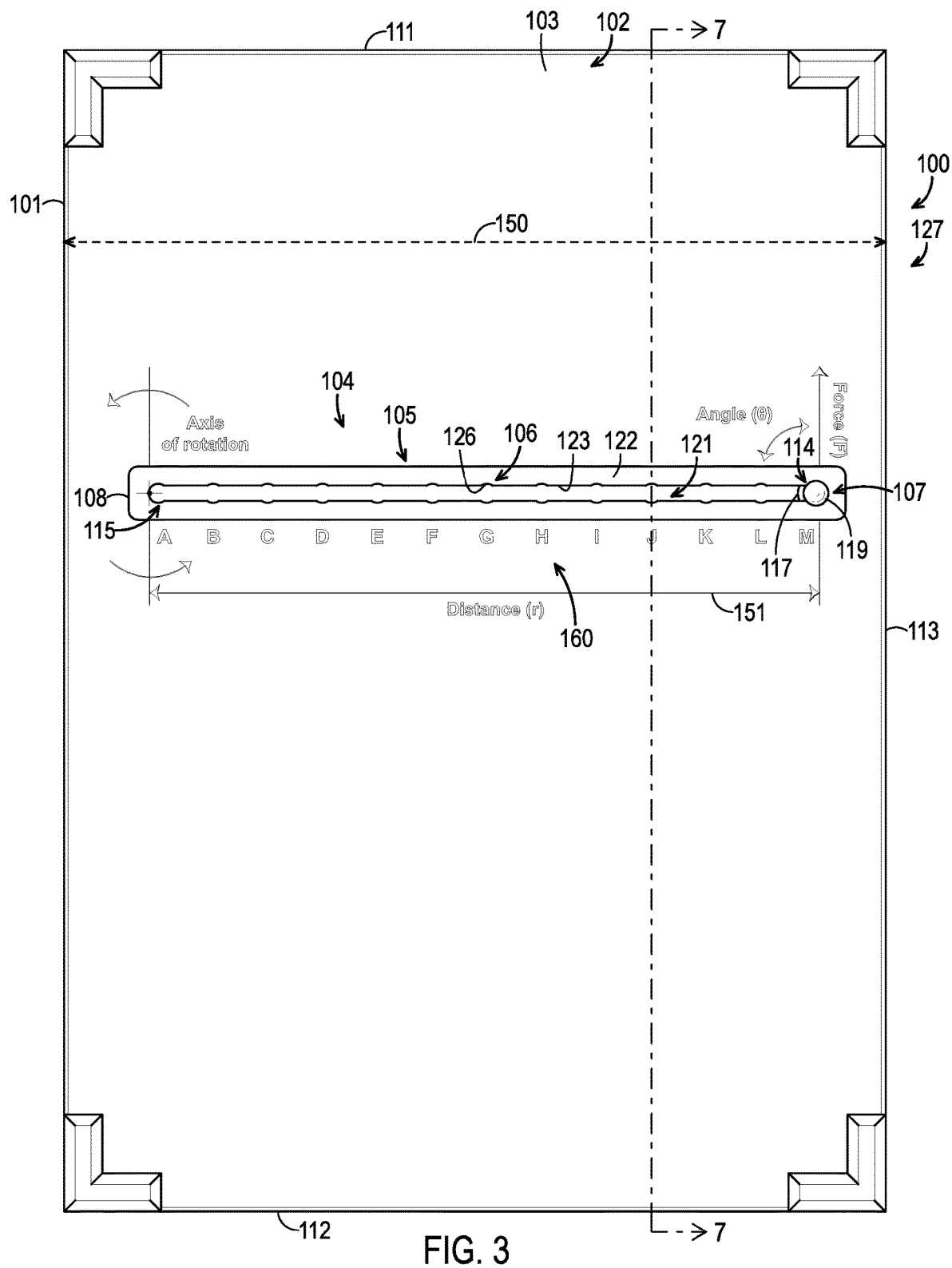
FIG. 3 is a top plan view of the educational book cover shown in FIG. 1 with a knob in a maximum torque position.
Figure 4:
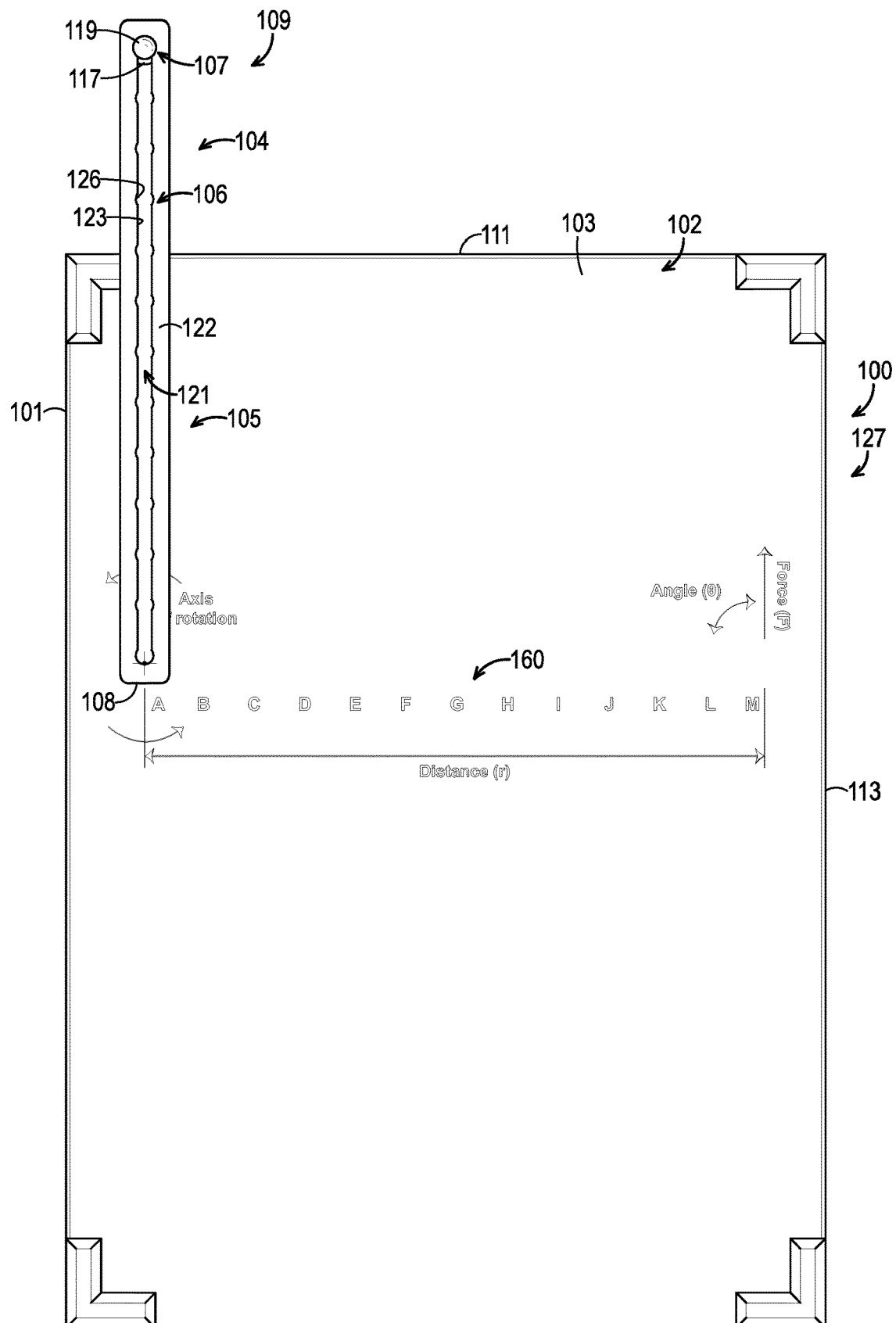
FIG. 4 is a top plan view of the educational book cover shown in FIG. 1 with the track rotated to a first orientation parallel to a spine and proximate a top of the cover member.

As shown in FIGS. 2 and 3, outer face 103 includes a bottom 112, a top 111, and a far end 113. The reader can see in FIGS. 1-6 that far end 113 is opposite spine 101 and extends parallel to spine 101 between bottom 112 and top 111 of outer face 103.

With reference to FIGS. 2 and 3, outer face 103 has an outer face width 150 oriented perpendicular to spine 101. Outer face width 150 extends across outer face 103 between spine 101 and far end 113. As shown in FIGS. 2 and 3, track 105 extends over at least 80 percent of outer face width 150 when track 105 is pivoted to be perpendicular to spine 101. Track 105 extending over a majority of outer face 103 provides an instructive range of pull positions to effectively demonstrate moment arm effects on torque.

The size and shape of the cover member may be varied as needed for a given application. In some examples, the cover member is larger or smaller relative to the other components than depicted in the figures.

The cover member may be any currently known or later developed type of book or binder cover. Various book cover types exist and could be used in place of the cover member shown in the figures. In addition to the types of book covers existing currently, it is contemplated that the educational book covers described herein could incorporate new types of book covers developed in the future.

In the present example, the cover member is composed of a book board material. However, the cover member may be composed of any currently known or later developed material suitable for book cover applications. Suitable materials include Davey board materials, metals, polymers, wood, and composite materials.

Pull Mechanism

The role of pull mechanism 104 is to enable a user to selectively pivot cover member 102 relative to spine 101. In particular, pull mechanism 104 functions to demonstrate physics concepts related to torque and moment arms by allowing a user to selectively adjust the position on cover member 102 relative to spine 101 where pulling or pivoting force on cover member 102 acts.

For example, when a user adjusts pull mechanism 104 to apply pivoting force farther away from spine 101, which defines the pivot axis, the force required to pivot cover member 102 is relatively low. In contrast, when a user adjusts pull mechanism 104 to apply pivoting force closer to spine 101, the force required to pivot cover member 102 is relatively high. The observed difference in pivoting force required to pivot cover member 102 provides students with a tangible demonstration of the interplay between torque and moment arms when opening cover member 102.

With reference to FIGS. 1-6, pull mechanism 104 is attached to outer face 103 of cover member 102. As shown in FIGS. 1-7, pull mechanism 104 includes a track 105 and a knob 107. The track and knob components are discussed in the sections below.

The size and shape of the pull mechanism may be varied as needed for a given application. In some examples, the pull mechanism is larger or smaller relative to the other components than depicted in the figures.

The pull mechanism may be any currently known or later developed type of pull mechanism. Various pull mechanism types exist and could be used in place of the pull mechanism shown in the figures. In addition to the types of pull mechanisms existing currently, it is contemplated that the educational book covers described herein could incorporate new types of pull mechanisms developed in the future.

The number of pull mechanisms in the educational book cover may be selected to meet the needs of a given application. The reader should appreciate that the number of pull mechanisms may be different in other examples than is shown in the figures. For instance, some educational book cover examples include additional than described in the present example.

Knob

Knob 107 functions to enable a student to pivot open cover member 102 by pulling on knob 107. Further, knob 107 cooperates with track 105 to allow a student to select the position on cover member 102 relative to spine 101 where the student's pulling force is located. The selective positioning of knob 107 relative to spine 101 beneficially and tangibly demonstrates torque related concepts to students.

For example, with reference to FIGS. 1-3, more force is required to pivot cover member 102 by pulling knob 107 when knob 107 is selectively translated within track 105 closer to spine 101 than when knob 107 is selectively translated within track 105 farther from spine 101. Further, more force is required to pivot cover member 102 by pulling knob 107 when track 105 is selectively pivoted to bring knob 107 closer to spine 101.

As shown in FIGS. 1-7, knob 107 is complementarily configured with track 105 to selectively rest within fixed pull positions 106 of track 105. Fixed pull positions 106 provide defined locations for knob 107 to securely rest in track 105 when a user pulls on knob 107 to pivot cover member 102. As shown in FIGS. 1-5, indicia 160 aligned with fixed pull positions 106 is provided on outer face 103 of cover member 102 to facilitate students recording different pull position experiments and to facilitate an educator guiding students on which pull positions to try.

The reader can see in FIGS. 1-7 that knob 107 includes a body 117, a neck 118, and a head 119. Body 117 supports neck 118, and head 119 is attached to neck 118.

Figure 7A:
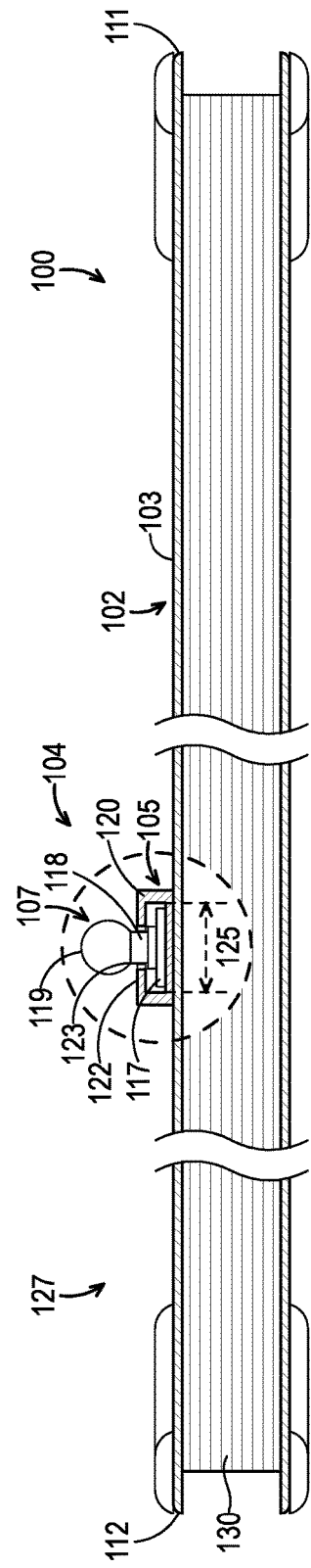
FIG. 7A is a cross section view of a pull mechanism of the educational book cover shown in FIG. 1 depicting a head of the knob extending above a top member of the track, a neck of the knob aligned with the top member, and a body of the knob disposed in a trough of the track below the top member.
Figure 8:
FIG. 8 is a bottom perspective view of a second embodiment of an educational book cover including rings removably securing pages to define an educational binder.

As depicted in FIG. 7A, body 117 is disposed in a channel 121 of track 105. In particular, body 117 resides between a trough 120 and a top member 122 of track 105. With reference to FIGS. 7A and 7B, body 117 is restricted from passing through a slot 123 of track 105. Body 117 is restricted from passing through slot 123 because it has a body dimension 125 that exceeds a gap dimension 124 of slot 123. The reader can see in FIG. 7A that body dimension 125 corresponds to gap dimension 124 in the sense that the two dimensions are aligned.

As depicted in FIG. 7A, neck 118 extends from body 117 and connects body 117 to head 119. With reference to FIGS. 1 and 7A, neck 118 extends through slot 123 of track 105. Neck 118 and slot 123 are complementarily configured to enable neck 118 to slide within slot 123 and to be laterally supported by slot 123. As shown in FIGS. 1-5, neck 118 and a notch 126 of track 105 are complementarily configured to enable neck 118 to extend into notch 126.

As shown in FIGS. 1 and 7A, head 119 is fixed to neck 118 and enables a user to grip knob 107. A user grips knob 107 via head 119 for multiple purposes. Indeed, a user grips knob 107 via head 119 to pull on cover member 102 to pivot it relative to spine 101, to translate knob 107 within track 105, and to rotate track 105 relative to cover member 102. Additionally or alternatively, one may rotate track 105 by pressing on track 105 directly rather than pressing on knob 107 linked to track 105.

The reader can see in FIGS. 1-7 that head 119 is disposed outside channel 121 of track 105. Head 119 being disposed outside channel 121 and above top member 122 allows a user to conveniently interact with knob 107 despite body 117 and a portion of neck 118 being disposed within channel 121.

The size and shape of the knob may vary significantly from the knob depicted in the figures. For example, the knob may have a square, triangular, or other regular polygon shape. In some examples, the head has the shape of a letter, number, or a symbol. In certain examples, the head has an ornamental design, such as resembling an animal, object, person, or place. In select examples, the knob has an irregular shape.

The number of knobs included in the pull mechanism may vary. For example, some pull mechanisms include two or more knobs.

In the present example, the knob is composed of metal. However, the knob may be composed of any currently known or later developed material suitable for pull member applications. Suitable materials include metals, polymers, ceramics, wood, and composite materials.

Track

Track 105 functions to enable a user to move knob 107 to explore the effect of different pull positions on torque. Further, track 105 serves to link knob 107 to cover member 102 such that pulling on knob 107 serves to pull on cover member 102.

As depicted in FIGS. 1-7, track 105 is coupled to outer face 103 of cover member 102. In the present example, as shown in FIGS. 2-5, track 105 is pivotally coupled to outer face 103. In other examples, however, the track is fixed to the cover member without being configured to pivot.

As depicted in FIGS. 1-5, track 105 includes a first longitudinal end 108. With reference to FIGS. 2-5, track 105 is pivotally coupled to outer face 103 at first longitudinal end 108. In other examples, the pivotal coupling point is at a medial position of the track instead of on an end.

In the present example, as can be seen in FIGS. 2-5, track 105 is pivotally coupled to outer face 103 proximate spine 101. More specifically, as shown in FIGS. 2-5, track 105 is pivotally coupled to outer face 103 proximate a medial position of spine 101, which enables track 105 to pivot 180 degrees. However, the pivot point of the track may be located anywhere on the outer face of the cover member. For example, the pivot point could be located in the center of the cover member to enable the track to pivot 360 degrees.

Figure 5:
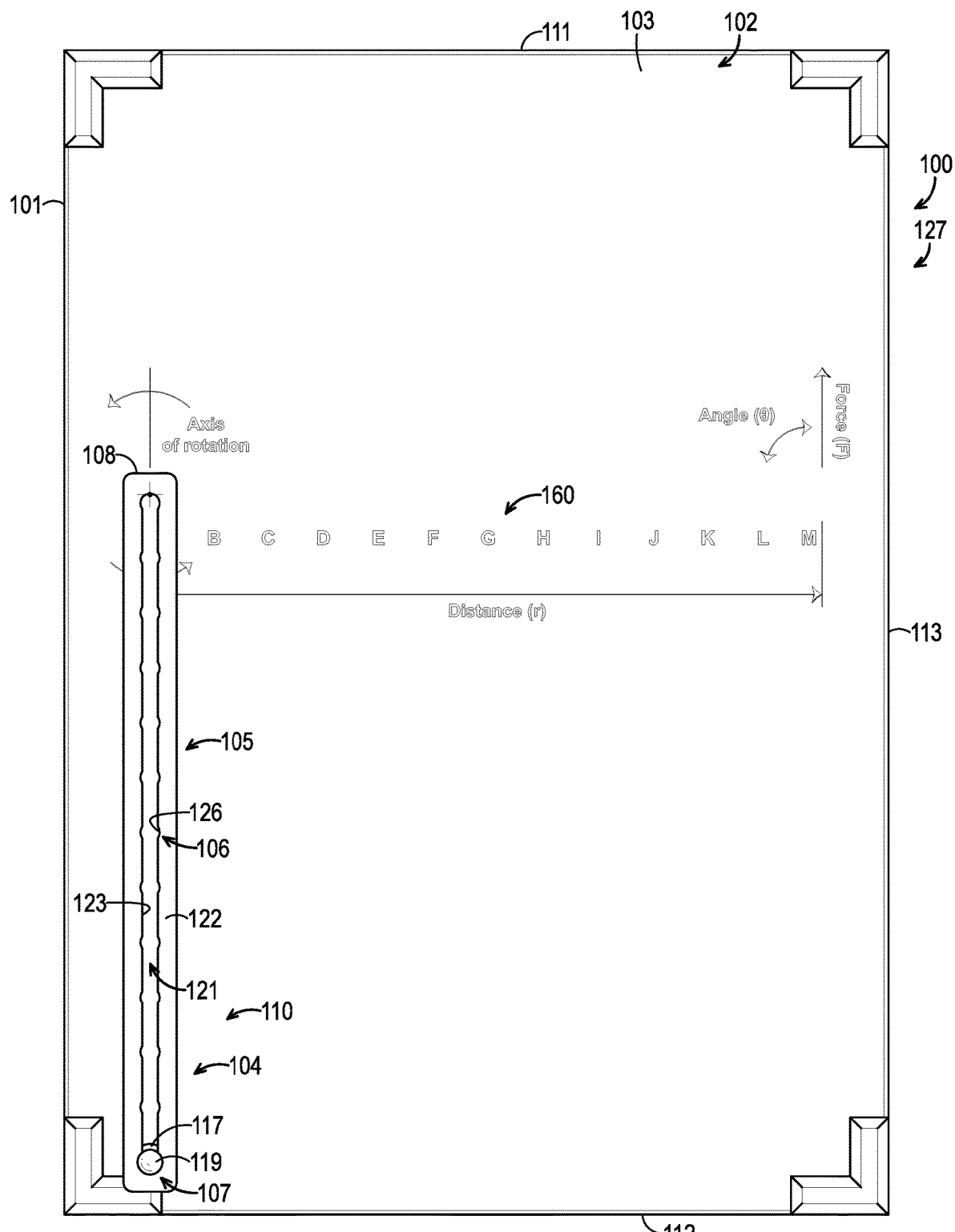
FIG. 5 is a top plan view of the educational book cover shown in FIG. 1 with the track rotated to a second orientation parallel to the spine and proximate a bottom of the cover member.

In more detail, with reference to FIGS. 2-5, track 105 is configured to pivot about a range of 180 degrees between a first orientation 109 and a second orientation 110. As depicted in FIG. 5, track 105 extends towards a bottom 112 of outer face 103 in second orientation 110. The reader can see in FIG. 4 that track 105 extends towards a top 111 of outer face 103 in first orientation 109.

In other examples, the track is configured to pivot less than 180 degrees or more than 180 degrees. For example, the track may be configured to pivot 45 degrees, 90 degrees, 360 degrees, or some intermediate amount. In some examples, the track is not configured to pivot relative to the cover member.

The reader can see in FIGS. 2 and 3 that track 105 has a track length 151. To provide a meaningful range of moment arm locations for students to explore, track length 151 is at least 80% of outer face width 150. With reference to FIGS. 1-5, track 105 defines fixed pull positions 106 along the length of track 105.

The reader can see in FIG. 3 that fixed pull positions 106 include a maximum torque position 114 proximate far end 113 when track 105 is oriented perpendicular to spine 101. A minimum amount of force is required to pivot cover member 102 relative to spine 101 when knob 107 is translated to maximum torque position 114.

With reference to FIG. 2, fixed pull positions 106 include a minimum torque position 115 proximate spine 101 when track 105 is oriented perpendicular to spine 101. Minimum torque position 115 is on an opposite side of track 105 than maximum torque position 114. A maximum amount of force is required to pivot cover member 102 relative to spine 101 when knob 107 is translated to minimum torque position 115. As shown in FIGS. 2 and 3, fixed pull positions 106 include a plurality of intervening torque positions between maximum torque position 114 and minimum torque position 115.

The reader can see in FIGS. 1-5 that fixed pull positions 106 are each defined by a notch 126 defined in slot 123. As shown in FIGS. 1-5, neck 118 of knob 107 and notch 126 are complementarily configured to enable neck 118 to extend into notch 126. The reader can see in FIGS. 1-5 that notch 126 restricts knob 107 from translating in track 105 when neck 118 selectively extends into notch 126.

The size and shape of the fixed pull positions may be varied as needed for a given application. In some examples, the fixed pull positions are larger or smaller relative to the other components than depicted in the figures.

The number of fixed pull positions in the educational book cover may be selected to meet the needs of a given application. The reader should appreciate that the number of fixed pull positions may be different in other examples than is shown in the figures. For instance, some educational book cover examples include additional or fewer fixed pull positions than described in the present example.

As depicted in FIGS. 1-7B, track 105 includes a trough 120 and a top member 122. With reference to FIGS. 1-5 and 7A, trough 120 defines a channel 121. Channel 121 receives body 119 of knob 107 and facilitates body 119 translating along track 105.

As shown in FIGS. 1-5 and 7A, top member 122 is supported on trough 120 over channel 121. Top member 122 retains body 119 within channel 121 while also allowing knob 107 to translate relative to track 105.

The reader can see in FIGS. 1-5 that top member 122 defines a slot 123 extending longitudinally along the length of track 105. Slot 123 provides access to channel 121 for neck 118 to extend out of channel 121 above top member 122.

As depicted in FIGS. 1-5, 7A, and 7B, slot 123 defines a gap dimension 124. Neck 118 and slot 123 are complementarily configured to enable neck 118 to extend through slot 123, to slide within slot 123, and to be laterally supported by slot 123. Body 117 is restricted from passing through slot 123 because it has a body dimension 125 that exceeds a gap dimension 124 of slot 123. The reader can see in FIG. 7A that body dimension 125 corresponds to gap dimension 124 in the sense that the two dimensions are aligned.

The size and shape of the track may be varied as needed for a given application. In some examples, the track is larger or smaller relative to the other components than depicted in the figures. In the present example, the track is straight, but it may be curved, bent, or angled in other examples.

The track may be any currently known or later developed type of track. Various track types exist and could be used in place of the track shown in the figures. In addition to the types of tracks existing currently, it is contemplated that the educational book covers described herein could incorporate new types of tracks developed in the future.

In the present example, the track is composed of metal. However, the track may be composed of any currently known or later developed material suitable for slotted track applications. Suitable materials include metals, polymers, ceramics, wood, and composite materials.

Pages

Pages 130 serve to display printed matter or to record printed matter. As depicted in FIGS. 1 and 6, pages 130 are bound to spine 101 to define an educational book 127. As depicted in FIGS. 1 and 6, cover member 102 covers pages 130 until cover member 102 is pivoted relative to spine 101 to uncover pages 130.

The pages may be any currently known or later developed type of page for a book with any manner of printed subject matter thereon. The pages may be composed of paper or any other suitable material for book applications. The number of pages will vary widely between different educational book examples.

Additional Embodiments

With reference to FIG. 8 not yet discussed in detail, the discussion will now focus on an additional educational book cover embodiment. The additional embodiment includes many similar or identical features to educational book cover 100. Thus, for the sake of brevity, each feature of the additional embodiment below will not be redundantly explained. Rather, key distinctions between the additional embodiment and educational book cover 100 will be described in detail and the reader should reference the discussion above for features substantially similar between the different educational book cover examples.

Educational Book Cover Embodiment Two

Turning attention to FIG. 8, an educational book cover 200 will now be described as a second example of an educational book cover. As can be seen in FIG. 8, educational book cover 200 includes a spine 201, a cover member 202, a pull mechanism 204, and rings 228. As is apparent from FIG. 8, educational book cover 200 with rings 228 defines an educational binder 229.

Educational binder 229 enables students to experiment with torque parameters like educational book 127 discussed above. However, educational binder 229 allows a student or instructor to add and remove pages or sheets as desired in contrast to a book where the pages are generally fixed to the spine. Educational binder 229 can be shipped without pages to reduce weight and shipping costs. Thereafter, pages may be inserted into educational binder 229 in a location relatively close to the intended recipient.

The reader can see in FIG. 8 that rings 228 couple to spine 201. In the present example, educational binder 229 includes four rings 228 coupled to spine 201, but other educational binder examples include fewer and additional rings.

As depicted in FIG. 8, rings 228 are configured to support pages or sheets selectively mounted to rings 228. Further, rings 228 are configured to be selectively opened to selectively remove sheets or to selectively add additional sheets.

The size and shape of the rings may vary to meet desired specifications. For example, some ring examples are round whereas others are D-shaped or configured in other suitable shapes. Larger rings may be selected to accommodate more pages while smaller rings may be selected to yield a more compact educational binder.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An educational book cover comprising:
   a spine;
   a cover member pivotally coupled to the spine and having an outer face; and
   a pull mechanism attached to the outer face of the cover member and including:
      a track pivotally coupled to the outer face and defining fixed pull positions along the length of the track;
      a knob movingly supported within the track and configured to selectively translate relative to the track to modify the spacing between the knob and the spine, the knob being complementarily configured with the track to selectively rest within the fixed pull positions;
   wherein:
      the track projects above the outer face and mechanically links the knob to the cover member to transfer pulling force exerted on the knob to the cover member;
      more force is required to pivot the cover member relative to the spine by pulling the knob when the knob is selectively translated within the track closer to the spine than when the knob is selectively translated within the track farther from the spine;
      the cover member includes unique indicia aligned with each fixed pull position to identify and differentiate the fixed pull positions for educational purposes.

2. The educational book cover of claim 1, wherein the track is pivotally coupled to the outer face proximate the spine.

3. The educational book cover of claim 2, wherein:
   the track includes a first longitudinal end; and
   the track is pivotally coupled to the outer face at the first longitudinal end.

4. The educational book cover of claim 3, wherein the track is pivotally coupled to the outer face proximate a medial position of the spine.

5. The educational book cover of claim 4, wherein:
   the track is configured to pivot about a range of 180 degrees between a first orientation and a second orientation;
   the track is parallel to the spine and extends towards a top of the outer face in the first orientation; and
   the track is parallel to the spine and extends towards a bottom of the outer face in the second orientation.

6. The educational book cover of claim 1, wherein:
   the track has a track length;
   the outer face has an outer face width perpendicular to the spine; and
   the track length is at least 80% of the outer face width.

7. The educational book cover of claim 1, wherein the knob includes:
   a body;
   a neck extending from the body; and
   a head fixed to the neck.

8. The educational book cover of claim 7, wherein:
   the track includes:
      a trough defining a channel above the outer face; and
      a top member supported on the trough over the channel;
   the top member defines a slot extending longitudinally along the length of the track and providing access to the channel.

9. The educational book cover of claim 8, wherein:
   the body is disposed in the channel between the trough and the top member;
   the neck extends through the slot; and
   the head is disposed outside the channel.

10. The educational book cover of claim 9, wherein:
    the slot defines a gap dimension; and the body is restricted from passing through the slot by having a body dimension corresponding to the gap dimension that exceeds the gap dimension.

11. The educational book cover of claim 1, wherein the fixed pull positions are each defined by a notch defined in the slot.

12. The educational book cover of claim 11, wherein the neck and the notch are complementarily configured to enable the neck to extend into the notch.

13. The educational book cover of claim 12, wherein the notch restricts the knob from translating in the track when the neck extends into the notch.

14. The educational book cover of claim 1, further comprising pages bound to the spine to define an educational book.

15. The educational book cover of claim 14, wherein the cover member covers the pages bound to the spine until the cover member is pivoted relative to the spine away from the pages.

16. The educational book cover of claim 1, wherein:
the educational book cover further comprises a ring coupled to the spine to define an educational binder; and
the ring is configured to support pages selectively mounted to the ring.

17. An educational book cover comprising:
a spine;
a cover member pivotally coupled to the spine and having an outer face; and
a pull mechanism attached to the outer face of the cover member and including:
    a track pivotally coupled to the outer face; and
    a knob movingly supported within the track and configured to selectively translate relative to the track to modify the spacing between the knob and the spine;
wherein the track projects above the outer face and mechanically links the knob to the cover member to transfer pulling force exerted on the knob to the cover member;
wherein more force is required to pivot the cover member relative to the spine by pulling the knob when the knob is selectively translated within the track closer to the spine than when the knob is selectively translated within the track farther from the spine.

18. The educational book cover of claim 17, wherein:
the track defines fixed pull positions along the length of the track; and
the knob is complementarily configured with the track to selectively rest within the fixed pull positions.

19. An educational book cover comprising:
a spine;
a cover member pivotally coupled to the spine and having an outer face; and
a pull mechanism attached to the outer face of the cover member and including:
    a track coupled to the outer face and defining fixed pull positions along the length of the track;
    a knob movingly supported within the track and configured to selectively translate relative to the track to modify the spacing between the knob and the spine, the knob being complementarily configured with the track to selectively rest within the fixed pull positions;
wherein:
    the track projects above the outer face and mechanically links the knob to the cover member to transfer pulling force exerted on the knob to the cover member;
    more force is required to pivot the cover member relative to the spine by pulling the knob when the knob is selectively translated within the track closer to the spine than when the knob is selectively translated within the track farther from the spine;
    the cover member includes unique indicia aligned with each fixed pull position to identify and differentiate the fixed pull positions for educational purposes;
    the fixed pull positions are each defined by a notch defined in the slot;
    the neck and the notch are complementarily configured to enable the neck to extend into the notch; and
    the notch restricts the knob from translating in the track when the neck extends into the notch.

* * * * *